United States Patent
Brueck et al.

(10) Patent No.: US 9,181,874 B2
(45) Date of Patent: Nov. 10, 2015

(54) TURBINE FOR AN INTERNAL COMBUSTION ENGINE

(71) Applicant: Bosch Mahle Turbo Systems GmbH & Co. KG, Stuttgart (DE)

(72) Inventors: Marc Brueck, Rottenburg (DE); Sascha Klett, Oppenweiler (DE); Martin Rauscher, Ludwigsburg (DE); Hartmut Weiss, Stuttgart (DE)

(73) Assignee: BOSCH MAHLE TURBO SYSTEMS GMBH & CO. KG (DE)

( * ) Notice: Subject to any disclaimer, the term of this patent is extended or adjusted under 35 U.S.C. 154(b) by 286 days.

(21) Appl. No.: 13/952,167

(22) Filed: Jul. 26, 2013

(65) Prior Publication Data

US 2014/0026562 A1 Jan. 30, 2014

(30) Foreign Application Priority Data

Jul. 26, 2012 (DE) .......................... 10 2012 213 161

(51) Int. Cl.
*F02D 23/00* (2006.01)
*F02C 7/00* (2006.01)
(Continued)

(52) U.S. Cl.
CPC ................ *F02C 7/00* (2013.01); *F01D 21/003* (2013.01); *F01N 13/008* (2013.01); *F01N 2560/025* (2013.01); *F02B 39/16* (2013.01); *F05D 2220/40* (2013.01); *F05D 2270/80* (2013.01)

(58) Field of Classification Search
CPC ... F04D 27/0207; F04D 27/0215; F02C 7/00; F01N 13/008; F01N 2560/025; F01D 21/003; F05D 2270/80; F05D 2220/40; F02B 39/16; F02B 37/18; F02B 37/24; F02B 37/22; F02B 37/186; F02D 41/0007
USPC .......................................................... 60/602
See application file for complete search history.

(56) References Cited

U.S. PATENT DOCUMENTS

| 4,439,728 | A | * | 3/1984 | Rickman, Jr. ................. 324/164 |
| 7,984,612 | B2 | * | 7/2011 | Weymann .................... 60/605.1 |

(Continued)

FOREIGN PATENT DOCUMENTS

| DE | 102007021763 A1 | 11/2007 |
| DE | 102009046391 A1 | 5/2011 |

(Continued)

OTHER PUBLICATIONS

English abstract for JP-2009287409.
English abstract for DE-102009046391.
English abstract for DE-102010003236.
(Continued)

*Primary Examiner* — Thomas Denion
*Assistant Examiner* — Vikansha Dwivedi
(74) *Attorney, Agent, or Firm* — Fishman Stewart Yamaguchi PLLC

(57) ABSTRACT

A turbine may include a turbine housing having an inlet opening and an outlet opening, and defining a housing interior space configured to be subjected to a through-flow of exhaust gas from an internal combustion engine. A turbine rotor may be rotatably mounted in the turbine housing about an axis of rotation defining an axial direction. An exhaust gas sensor may be arranged in a measurement space of the turbine housing the exhaust gas sensor configured to determine at least one part of a gas component of the exhaust gas carried in the turbine housing. A feed line may be arranged in the turbine housing having a feed opening and a discharge line arranged in the turbine housing having a discharge opening for feeding and discharging exhaust gas at least one of in and out of the measurement space.

20 Claims, 3 Drawing Sheets

(51) Int. Cl.
*F01N 13/00* (2010.01)
*F01D 21/00* (2006.01)
*F02B 39/16* (2006.01)

(56) References Cited

U.S. PATENT DOCUMENTS 8,043,047 B2 * 10/2011 Ante et al. .................... 415/118
2008/0163623 A1   7/2008 Eiraku et al.

FOREIGN PATENT DOCUMENTS

| | | |
|---|---|---|
| DE | 102010003236 A1 | 9/2011 |
| EP | 2559887 A1 | 2/2013 |
| JP | 0196438 | 4/1989 |
| JP | 2009287409 A | 12/2009 |

OTHER PUBLICATIONS

German Search Report for DE102012213161.2.

* cited by examiner

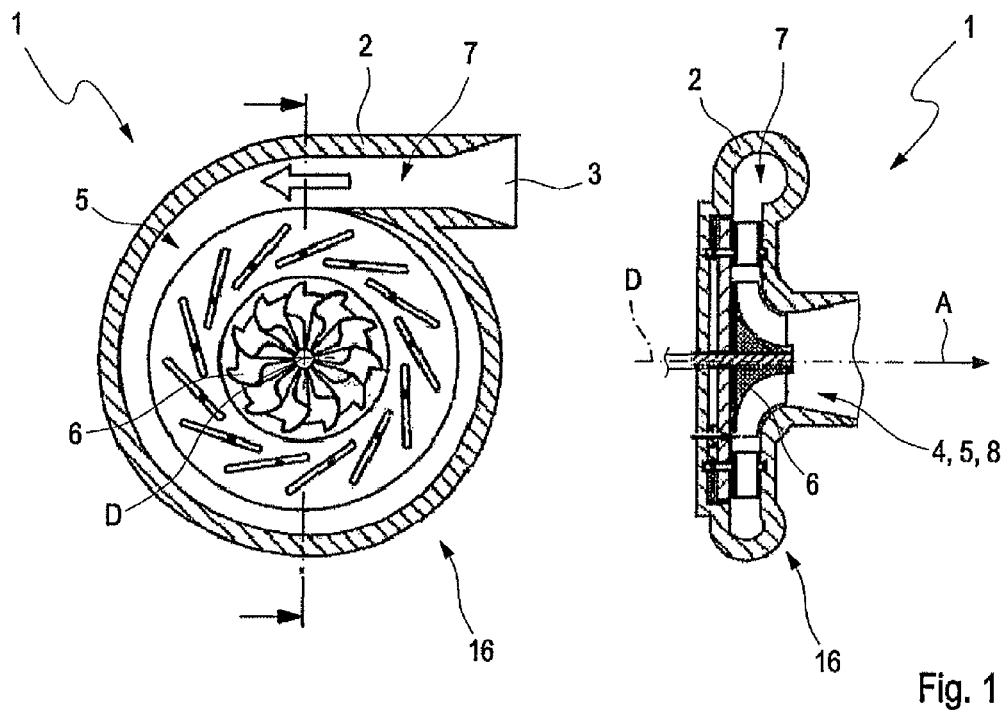
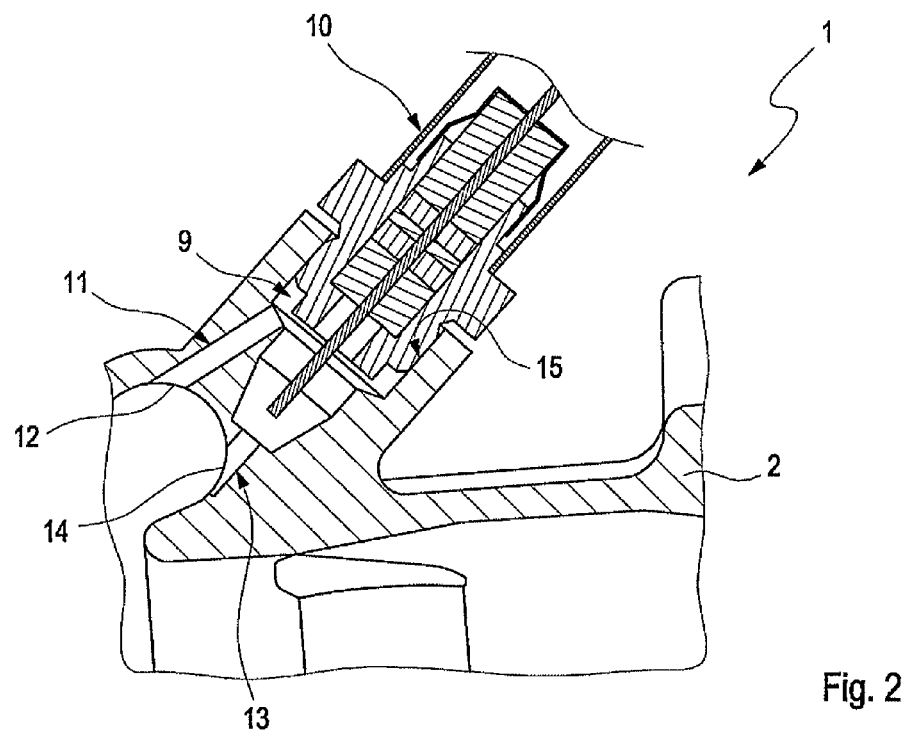
Fig. 1
Fig. 2

TURBINE FOR AN INTERNAL COMBUSTION ENGINE

CROSS-REFERENCE TO RELATED APPLICATIONS

This application claims priority to German Patent Application 10 2012 213.161.2 filed Jul. 26, 2012 which is hereby incorporated by reference in its entirety.

TECHNICAL FIELD

The invention relates to a turbine for an internal combustion engine as well as to an exhaust gas turbocharger having such a turbine.

BACKGROUND

In motor vehicles, the exhaust gas generated by an internal combustion engine is frequently re-treated by means of an exhaust gas turbocharger, wherein such an exhaust gas turbocharger for this purpose can be connected to the exhaust line of the internal combustion engine. In addition, the air-fuel ratio of the exhaust gas is controlled in internal combustion engines in that said exhaust gas is sensed with the help of a suitable exhaust gas sensor which is attached in the exhaust tract of the internal combustion engine. Control can take place in the known manner such that the air-fuel ratio sensed by means of the exhaust gas sensor is brought into agreement with a predetermined set value.

Decisive for an optimal function of the exhaust gas sensor is that the latter is attached in a suitable location of the exhaust gas tract so that defective sensor values of the exhaust gas sensor for example due to steam contained in the exhaust gas, which condenses into condensate on the exhaust gas sensor, are avoided. In the case that in the motor vehicle using the internal combustion engine both an exhaust gas turbocharger as well as a catalytic converter unit for cleaning the exhaust gas generated by the internal combustion engine are employed, such an exhaust gas sensor is usually arranged in a region between the exhaust gas turbocharger and the catalytic converter unit. Because of the relatively large thermal mass of the exhaust gas turbocharger, a relatively long period of time is required after a start-up of the internal combustion engine until the exhaust gas tract including exhaust gas turbocharger and (if present) catalytic converter unit in the internal combustion engine have an adequately high temperature so that it is ensured that steam contained in the exhaust gas cannot condense into condensate and lead to undesirable measurement errors for example because of an undesirable wetting of a measurement ceramic of the exhaust gas sensor with condensed steam.

A further disadvantage of conventional exhaust gas sensors, which are directly attached in the intake to the turbine of the exhaust gas turbocharger to avoid the abovementioned problems consists in that it can be damaged because of a thermal overload (thermal shock).

DE 10 2007 021 763 A1 relates to a turbine of a turbocharger, which is arranged on an exhaust gas passage. The turbine comprises an exhaust gas sensor, which is attached downstream and in the vicinity of the turbine of the exhaust gas turbocharger. The structural element of the exhaust gas sensor in this case is arranged on or in the vicinity of an outlet axis of an outlet channel of the turbine of the exhaust gas turbocharger.

DE 10 2009 046 391 A1 describes a method for operating an exhaust gas sensor exposed to the exhaust gas in the exhaust gas tract of an internal combustion engine, according to which exhaust gas is guided to the exhaust gas sensor by means of a capillary. To achieve a robust method, which ensures a highly dynamic measurement of the exhaust gas sensor and does not require any additional structural elements, the exhaust gas flowing to the exhaust gas sensor via the at least one capillary is branched off from the exhaust gas upstream of a stagnation pressure source generating an exhaust gas stagnation pressure.

SUMMARY

It is an object of the present invention to state an improved embodiment for a turbine for an internal combustion engine, in which the abovementioned disadvantages are eliminated or at least reduced.

The abovementioned object is solved through the subject of the independent claims. Preferred embodiments are subject of the dependent claims.

The turbine according to the invention comprises a turbine housing comprising an inlet and an outlet opening, wherein a housing interior space is enclosed by the turbine housing and can be subjected to a through-flow of exhaust gas from the internal combustion engine. The turbine furthermore comprises a turbine rotor which is rotatably mounted about an axis of rotation defining an axial direction in the turbine housing, which turbine rotor separates the housing interior space into a high-pressure region which is fluidically connected to the inlet opening and a low-pressure region which is fluidically connected to the outlet opening.

The turbine furthermore comprises a measurement space attached in the turbine housing, in which the exhaust gas sensor for determining at least one part of a gas component of the exhaust gas discharged in the turbine housing is at least partially arranged. According to the invention, a feed line with a feed opening and a discharge line with a discharge opening for feeding and discharging respectively of exhaust gas into or out of the measurement space each are formed in the turbine housing integrally with the turbine housing.

In the turbine according to the invention, a measurement space is thus separately formed, in which in turn the exhaust gas sensor according to the invention is arranged. This measurement space is preferentially located in the turbine housing arranged in such a manner that exhaust gas exiting from the internal combustion engine has to flow through a relatively small thermal volume or a thermal mass before entering the measurement space. In this way, the measurement space (by means of the exhaust gas flowing through it) can be relatively quickly heated up to an adequately high temperature after a start-up of the internal combustion engine connected upstream of the turbine, at which temperature an undesirable condensing of steam contained in the exhaust gas can be largely avoided. Because of the provision of a feed and discharge line respectively, which are integrally formed in the turbine housing, separate feed and discharge lines respectively with undesirably long running paths for the exhaust gas flowing through them are not required, so that the feed and discharge line as part of the turbine housing can also be heated up very quickly. In addition, the integral design of the feed and discharge line respectively in the turbine housing can be accomplished in a technically relatively simple and thus cost-effective manner.

The turbine according to the invention thus makes possible a highly operationally secure use of an exhaust gas sensor, in which the occurrence of measurement errors can be largely excluded.

Preferentially, the measurement space can be designed as a receiving opening provided on an outer surface of the turbine housing, in which the exhaust gas sensor can be inserted or screwed in, so that the exhaust gas sensor in a state inserted/screwed into the receiving opening is fluidically connected to the feed and discharge line. In this way, the exhaust gas sensor can be mounted to the turbine housing or the measurement space in a simple manner and when required, for example for maintenance or repair purposes, be removed again from said turbine housing or measurement space in a simple manner.

In a preferred embodiment, a region of the turbine housing enclosing the high-pressure region can be partially embodied as a volute, in which the feed opening of the feed line and the discharge opening of the discharge line are arranged. By means of such an arrangement of the feed and discharge line in the high-pressure region of the turbine housing it can be very favourably ensured that the exhaust gas exiting the internal combustion engine only has to flow through a small volume of the exhaust gas tract (between internal combustion engine and exhaust gas turbocharger) before entering the measurement space in which the exhaust gas sensor is arranged, so that an undesirable cooling down of the exhaust gas and condensation effects of steam contained in the exhaust gas connected with this can be largely or even completely avoided.

In a particularly preferred embodiment, a region of the turbine housing enclosing the high-pressure region can be partially formed as a volute, which upstream merges into a feed channel extending along a feed channel longitudinal direction, which on an end facing away from the volute comprises the inlet opening of the turbine housing. A flow cross section of the feed channel can become larger at least in sections along the longitudinal direction to the inlet opening and the feed and discharge opening can be arranged offset with respect to one another along the feed channel longitudinal direction in the feed channel, wherein the feed opening is arranged in a first section of the feed channel, which has a larger flow cross section than a second section of the feed channel, in which the discharge opening is arranged. Since the flow cross section of the feed channel becomes smaller from the inlet opening towards the volute, a pressure gradient in the exhaust gas also forms along the longitudinal direction of the feed channel, wherein according to the Bernoulli equation in combination with the continuity equation a greater exhaust gas pressure is also present in the region of the feed channel with the larger flow cross section than in the region of the feed channel with smaller flow cross section. Since the feed opening of the feed line is arranged in the region of the larger cross section of the feed channel and accordingly the discharge opening with the discharge line in the region of a smaller flow cross section, the pressure gradient can be used as driving force in order to feed and also remove again exhaust gas to/from the measurement space comprising the exhaust gas sensor.

In an embodiment which is alternative to this, the feed opening can be arranged in a cross-sectional profile at a first radial distance from a centre point defined by the axis of rotation of the turbine rotor and the discharge opening can be arranged at a second radial distance from the centre point, wherein the first radial distance is greater than the second radial distance. In this way, a pressure gradient formed in radial direction in the volute can be utilised in order to feed an adequately large quantity of exhaust gas to the measurement space via the feed opening and to discharge said exhaust gas again from the measurement space via the discharge line. Since the gas pressure generated by the exhaust gas increases with increasing radial distance from the centre point, the exhaust gas pressure in the region of the first radial distance, in which the feed opening is located arranged is greater than in the region of the second radial distance, in which the discharge line is located arranged. Thus, the radial pressure gradient of the exhaust gas pressure can also be utilised as driving force for the through-flow of the measurement space with exhaust gas. In a particularly preferred embodiment, the feed opening can be arranged offset in the axial direction with respect to the discharge opening.

In a further alternative embodiment, the feed opening can be arranged in the high-pressure region and the low-pressure opening in the low-pressure region of the turbine so that the feed line fluidically connects the measurement space to the high-pressure region and the discharge line fluidically connects the measurement space to the low-pressure region. In this case, the pressure drop of the exhaust gas which forms between the high-pressure region and the low-pressure region can be utilised in order to feed and discharge again exhaust gas to/from the measurement space.

Preferentially, the feed and the discharge line in the turbine housing is each formed as a through-bore. This makes possible a particularly simple manufacture of the feed and discharge line according to the invention.

In order to further reduce the manufacturing costs of the turbine according to the invention, the turbine housing in a particularly cost-effective embodiment can be a unitarily produced casting.

In order to be able to adjust a quantity of exhaust gas to be fed to the measurement space in a flexible manner, an actuator for adjusting an opening cross section of the feed and discharge line respectively can be arranged in the feed or discharge line.

Further important features and advantages of the invention are obtained from the subclaims, from the drawings and from the associated Figure description by means of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description.

BRIEF DESCRIPTION OF THE DRAWINGS

It shows, in each case schematically:

FIG. 1 a first exemplary embodiment of the turbine according to the invention,

FIG. 2 a perspective part view of the turbine according to FIG. 1,

DETAILED DESCRIPTION

Figure 3:
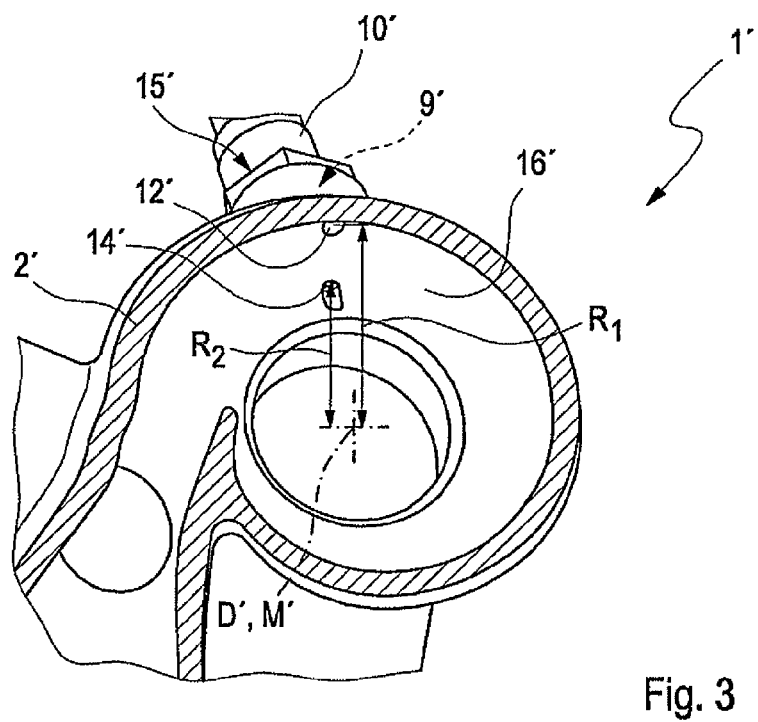
FIG. 3 a second exemplary embodiment of the turbine according to the invention.

In FIGS. 1 and 2, a turbine according to the invention for an internal combustion engine is rough-schematically shown and designated with 1. In this case, FIG. 1 shows the turbine in a longitudinal and cross-sectional view without the exhaust gas sensor according to the invention, FIG. 2 shows the turbine 1 of FIG. 1 in an isometric part view and with the exhaust gas sensor according to the invention.

The turbine 1 comprises a turbine housing 2 with an inlet opening 3 and an outlet opening 4. The turbine housing 2 encloses a housing interior space 5, which can be subjected to a through-flow of an exhaust gas from an internal combustion engine. In the turbine housing 2, a turbine rotor 6 is arranged, which is rotatably mounted about an axis of rotation D defining an axial direction A. The turbine rotor 6 separates the housing interior space 5 and a high-pressure region 7 which is fluidically connected to the inlet opening 3 from a low-pressure region 8 which is fluidically connected to the outlet opening. The turbine 1 according to the invention furthermore comprises a measurement space 9 (see FIG. 2) attached in the turbine housing 2, in which an exhaust gas sensor 10 for determining at least one part of a gas component of the exhaust gas carried in the turbine housing 2 is at least partially arranged. Preferentially, the exhaust gas sensor 10 is a lambda probe.

In the turbine housing 2, a feed line 11 with a feed opening 12 and a discharge line 13 with a discharge opening 14 for feeding and discharging exhaust gas respectively into or out of the measurement space 9 are integrally formed with the turbine housing. From the representation of FIG. 2 it is evident that feed line 11, discharge line 13 and measurement space 9 are arranged outside an exhaust gas main path in the manner of a bypass. FIG. 2 furthermore shows that the turbine housing 2 on an outer surface comprises a receiving opening 15, in which the exhaust gas sensor 10 can be inserted or screwed in, so that the exhaust gas sensor 10 in a state inserted in the receiving opening 15 is fluidically connected to the feed and discharge line 11, 13. For screwing in the receiving opening 15, a corresponding internal or external thread can be provided in said receiving opening 15 and in the exhaust gas sensor 10 respectively.

Viewing the representation of FIG. 1 again, it is evident that a region of the turbine housing 2 enclosing the high-pressure region 7 can be partially formed as a volute 16, in which the feed opening 12 of the feed line 11 and the discharge opening 14 of the discharge line 13 are arranged.

In FIG. 3, a variant of the turbine 1' according to the invention is shown in an isometric part view, according to which the feed opening 12' is arranged in a cross-sectional profile (not shown in FIG. 3) at a first radial distance $R_1$ from a centre point M' defining the axis of rotation D' of the turbine rotor 6 (not shown in FIG. 3) and the discharge opening 14' at a second radial distance $R_2$ from the centre point M', wherein the first radial distance $R_1$ is greater than the second radial distance $R_2$. Because of the radial pressure drop between the feed opening 12' and the discharge opening 14', a driving force, which guides and discharges again exhaust gas into/from the measurement space 9', is active. Here, the radial pressure drop forms because of the deflection of exhaust gas when entering the volute 16' because of the centrifugal forces which are active there, wherein the exhaust gas pressure in the volute 16' radially increases towards the outside. By means of the above described arrangement of the feed opening 12' or discharge opening 14', the radial pressure gradient of the exhaust gas can be utilised for a through-flow of the measurement space 9' and thus of the sensor element 10' arranged in the measurement space 9'.

Figure 4:
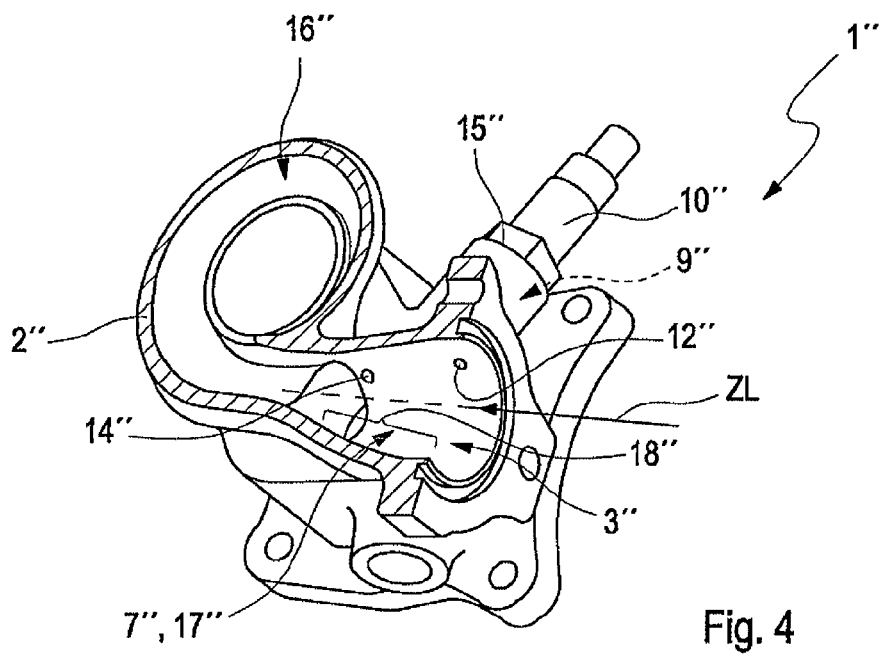
FIG. 4 a third exemplary embodiment of the turbine according to the invention.

In a variant of the exemplary embodiment shown in a part view in FIG. 4, which likewise represents the turbine 1" in an isometric part view, a region of the turbine housing 2" enclosing the high-pressure region 7" is partially formed as a volute 16", which upstream merges into a feed channel 17" extending along a feed channel longitudinal direction ZL, which on an end facing away from the volute 16" comprises the inlet opening 3" of the turbine housing 2". From the representation of FIG. 4 it is directly evident that a flow cross section of the feed channel 17" increases in size along the feed channel longitudinal direction ZL in sections towards the inlet opening 3". According to the variant, the feed and discharge opening 12" and 14" are arranged along the feed channel longitudinal direction ZL offset to one another in the feed channel 17". The feed opening 12" in this case is arranged in a section of the feed channel 17", which has a larger flow cross section than a second section of the feed channel 17", in which the discharge opening 14" is arranged. In this way, the present pressure drop between feed opening 12" and discharge opening 14" is utilised in order to ensure an effective through-flow with exhaust gas of the measurement space 9" comprising the exhaust gas sensor 10". The establishment of a pressure gradient in flow direction of the exhaust gas is thus due to the cross-sectional geometry of the feed channel 17" which tapers in feed channel longitudinal direction ZL. For because of the tapering flow cross section the stagnation pressure decreases in a region with reduced flow cross section while in the region with increased flow cross section the stagnation pressure of the exhaust gas increases (see Bernoulli law and continuity equation). The feed opening 12" and the discharge opening 14" can be arranged in the feed channel 17" relative to each other such that steam already condensed into water and water transported as liquid film in the feed channel 17" is already moved due to gravity onto a wall region 18" located opposite the two openings 12", 14", so that the liquid film cannot reach the exhaust gas sensor 10" in an undesirable manner by way of the openings 12", 14".

Figure 5:
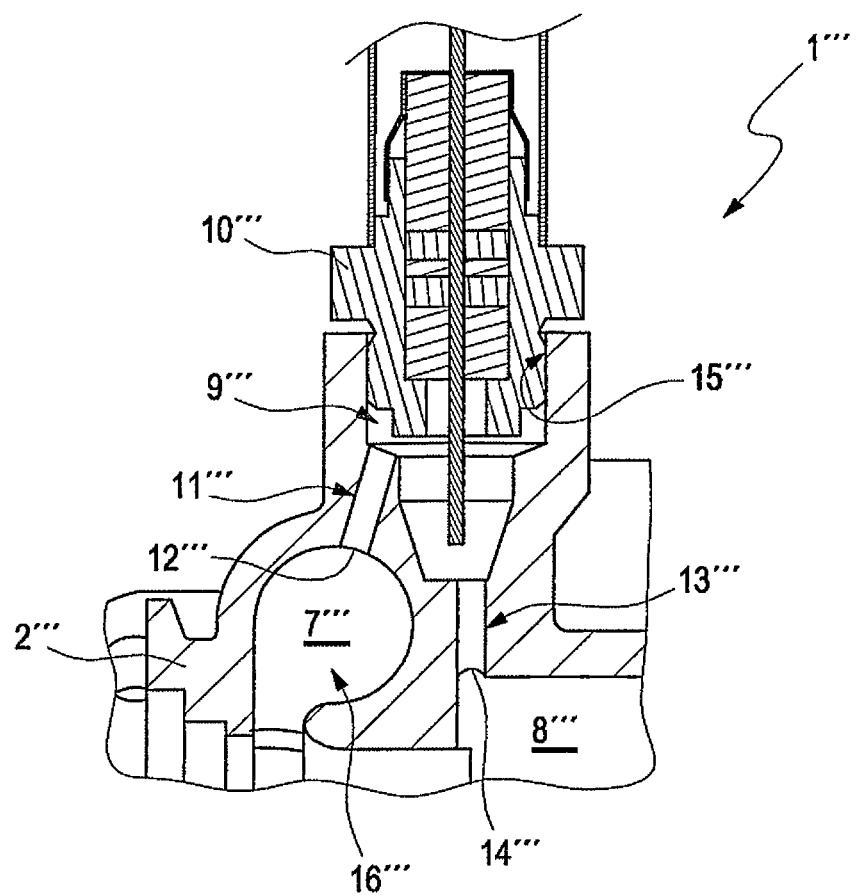
FIG. 5 a fourth exemplary embodiment of the turbine according to the invention.

In a further variant of the turbine 1''' according to the invention shown in FIG. 5, the feed opening 12''' is arranged in the high-pressure region 7''' and the low-pressure opening 14''' in the low-pressure region 8''', so that the feed line 11''' fluidically connects the exhaust gas sensor 10''' to the high-pressure region 7''' in a state arranged in the measurement space 9''' and the discharge line 13''' fluidically connects the exhaust gas sensor 10''' in a state arranged in the measurement space 9''' to the low-pressure region 8'''. For utilising the pressure gradient between the high-pressure region 7''' and the low-pressure region 8''' of the turbine housing 2''', a type of bypass is thus formed between the volute 16''' and an outflow region of the turbine wheel of the turbine 1'''. The feed line 11''' is then arranged in the region of the volute 16''' in the turbine housing.

In all embodiment variants explained above, the feed and the discharge lines in the turbine housing 2, 2', 2", 2''' are each preferentially formed as a through-bore. Likewise, the turbine housing 2, 2', 2", 2''' can be a unitarily produced casting in all these embodiment variants. In a variant which is not shown in the exemplary embodiments of the FIGS. 1 to 5, an actuator for adjusting an opening cross section of the feed or discharge line can be arranged in the feed or discharge line.

In all embodiment variants introduced above, the feed opening 12, 12', 12", 12''' and the discharge opening 14, 14', 14", 14''' can be arranged in the turbine housing 2, 2', 2", 2''' such that in the region of these two openings steam already condensed into water and also water transported as a liquid film is transported away from the two openings through centrifugal forces, so that it cannot reach the exhaust gas sensor 10, 10', 10", 10''' in an undesirable manner.

The turbine 1, 1', 1", 1''' according to the invention can be employed in an exhaust gas turbocharger for a motor vehicle and in addition to the turbine 1, 1', 1", 1''' according to the invention, additionally comprise a compressor, wherein turbine 1, 1', 1", 1''' and compressor are operationally interconnected mechanically. Here, the compressor can comprise a compressor rotor which is operationally connected mechanically to the turbine rotor 6 of the turbine 1, 1', 1", 1'''. It is clear that for the turbine 1, 1', 1", 1''' according to the invention, numerous other application possibilities are also obtained, for example in connection with an electric generator for power generation.

The exhaust gas sensor 10, 10', 10", 10''' can be used for the temperature limitation of the exhaust gas turbocharger 1, 1', 1", 1''', since by way of the temperature-dependent electrical internal resistance of a heating device provided in the exhaust gas sensor 10, 10', 10", 10''' the temperature of the exhaust gas striking the exhaust gas sensor 10, 10', 10", 10''' can be deduced.

The invention claimed is:

1. A turbine for an internal combustion engine, comprising:
    a turbine housing having an inlet opening and an outlet opening,
    wherein the turbine housing defines a housing interior space configured to be subjected to a through-flow of exhaust gas from the internal combustion engine,
    a turbine rotor rotatably mounted in the turbine housing about an axis of rotation defining an axial direction, which separates the turbine rotor configured to separate the housing interior space into a high-pressure region which fluidically connected to the inlet opening and a low-pressure region fluidically connected to the outlet opening,
    an exhaust gas sensor arranged in a measurement space of the turbine housing, the exhaust gas sensor configured to determine at least one part of a gas component of the exhaust gas carried in the turbine housing,
    a feed line arranged in the turbine housing, the feed line having a feed opening and a discharge line arranged in the turbine housing, the discharge line having a discharge opening for at least one of feeding and discharging exhaust gas in and out of the measurement space.

2. The turbine according to claim 1, wherein an outer surface of the turbine housing forms a receiving opening configured to receive the exhaust gas sensor, wherein the exhaust gas sensor is at least one of inserted and screwed in to be fluidically connected to the feed and discharge lines.

3. The turbine according to claim 2, wherein a region of the turbine housing enclosing the high-pressure region is partially formed as a volute, in which the feed opening of the feed line and the discharge opening of the discharge line are arranged.

4. The turbine according to claim 3, wherein the feed opening is arranged in a cross-sectional profile at a first radial distance from a centre point defining the axis of rotation of the turbine rotor and the discharge opening is arranged at a second radial distance from the centre point, the first radial distance being greater than the second radial distance.

5. The turbine according to claim 4, wherein the high-pressure region is enclosed in a region of the turbine housing that is partially formed as a volute for merging gas exhaust upstream into a feed channel extending along a feed channel longitudinal direction, the feed channel having an end facing away from the volute—and including the inlet opening of the turbine housing, wherein a flow cross section of the feed channel increases in size at least in sections toward the inlet opening along the feed channel longitudinal direction, and further wherein the feed and discharge opening are arranged in the feed channel offset with respect to one another along the feed channel longitudinal direction, wherein the feed opening is arranged in a first section of the feed channel, which has a larger flow cross section than a second section of the feed channel, in which the discharge opening is arranged.

6. The turbine according to claim 5, wherein the feed opening is arranged in the high-pressure region and the low-pressure opening is arranged in the low-pressure region so that the feed line fluidically connects the measurement space to the high-pressure region and the discharge line fluidically connects the measurement space to the low-pressure region.

7. The turbine according to claim 6, wherein the feed and the discharge lines are each formed as a through-bore in the turbine housing.

8. The turbine according to claim 7, wherein the turbine housing is a unitarily produced casting.

9. The turbine according to claim 8, further comprising an actuator for adjusting an opening cross section of the feed or discharge line arranged in at least one of the feed line and the discharge line.

10. The turbine according to claim 9, wherein the exhaust gas sensor is a lambda probe.

11. The turbine according to claim 1, wherein a region of the turbine housing enclosing the high-pressure region is partially formed as a volute, in which the feed opening of the feed line and the discharge opening of the discharge line are arranged.

12. The turbine according to claim 1, wherein
    the feed opening is arranged in a cross-sectional profile at a first radial distance from a centre point defining the axis of rotation of the turbine rotor and the discharge opening is arranged at a second radial distance from the centre point,
    the first radial distance being greater than the second radial distance.

13. The turbine according to any one of the claim 1, wherein
    the high-pressure region is enclosed in a region of the turbine housing that is partially formed as a volute for merging exhaust gas upstream into a feed channel extending along a feed channel longitudinal direction, the feed channel having an end facing away from the volute and including the inlet opening of the turbine housing, wherein
    a flow cross section of the feed channel increases in size at least in sections toward the inlet opening along the feed channel longitudinal direction,
    and further wherein the feed and discharge opening are arranged in the feed channel offset with respect to one another along the feed channel longitudinal direction, wherein the feed opening is arranged in a first section of the feed channel, which has a larger flow cross section than a second section of the feed channel, in which the discharge opening is arranged.

14. The turbine according to claim 1, wherein the feed opening is arranged in the high-pressure region and the low-pressure opening is arranged in the low-pressure region so that the feed line fluidically connects the measurement space to the high-pressure region and the discharge line fluidically connects the measurement space to the low-pressure region.

15. The turbine according to claim 1, wherein the feed and the discharge lines are each formed as a through-bore in the turbine housing.

16. The turbine according to claim 1, wherein the turbine housing is a unitarily produced casting.

17. The turbine according to claim 1, further comprising an actuator for adjusting an opening cross section of the feed or discharge line arranged in at least one of the feed line and the discharge line.

18. The turbine according to claim 1, wherein the exhaust gas sensor is a lambda probe.

19. An exhaust gas turbocharger, comprising:
- a turbine housing having an inlet opening and an outlet opening, wherein the turbine housing defines a housing interior space configured to be subjected to a through-flow of exhaust gas from an internal combustion engine,
- a turbine rotor rotatably mounted in the turbine housing about an axis of rotation defining an axial direction, the turbine rotor configured to separate the housing interior space into a high-pressure region fluidically connected to the inlet opening and a low-pressure region fluidically connected to the outlet opening,
- an exhaust gas sensor arranged in a measurement space of the turbine housing the exhaust gas sensor configured to determine at least one part of a gas component of the exhaust gas carried in the turbine housing,
- a feed line arranged in the turbine housing, the feed line having a feed opening and a discharge line arranged in the turbine housing, the discharge line having a discharge opening for feeding and discharging exhaust gas at least one of in and out of the measurement space, and
- a compressor and a turbine operationally interconnected with each other, claim.

20. The exhaust gas turbocharger according to claim 19, wherein the compressor includes a compressor rotor operationally connected to the turbine rotor of the turbine.

* * * * *